UNITED STATES PATENT OFFICE.

JAMES RILEY, OF CHICAGO, ILLINOIS.

IMPROVEMENT IN COMPOUNDS FOR REMOVING SCALE FROM STEAM-BOILERS.

Specification forming part of Letters Patent No. 182,774, dated October 3, 1876; application filed May 18, 1876.

*To all whom it may concern:*

Be it known that I, JAMES RILEY, of Chicago, in the county of Cook and State of Illinois, have invented a new and useful Improvement in Anti-Crustation Compound for Steam-Boilers, of which the following is a specification:

The ingredients of the compound are caustic soda, soda-ash, white-oak bark, black-oak bark, and walnut bark.

The invention consists in the combination of a decoction of walnut bark with the other ingredients, as hereinafter described.

A chemical analysis of the extract of walnut bark containing nine parts of water contains potash, thirty-one parts; sulphate of magnesia, two parts; resin, two parts; lime, thirteen parts; saccharine matter, five parts; coloring matter, eleven parts; chloride of sodium, one part; sulphate of alumina, nineteen parts.

The ingredients of the walnut bark most relied on in the compound hereinafter described are the sulphate of magnesia, resin, saccharine matter, sulphate of alumina, and salt, which are contained in larger quantities in this bark than in any substance so easily and cheaply obtained. The effect of these parts in the compound is to destroy the cohesive attraction of any sediment in the water for iron or copper, so that if scale be formed it will cleave off, and if not formed, sediment will not adhere to the flues. Alkalies and astringents or tannin have been before combined with other substances, but, to my knowledge, have not been combined with the ingredients of walnut bark, as given.

I take ten pounds of dry black-walnut bark, ten pounds of white-oak bark, and ten pounds of black-oak bark, and steep them separately, each in about three gallons of water, at about a boiling heat or a little less, till the dissolvable substance is taken up in the water. This generally takes about five hours, ground bark taking less time. The liquids are then strained from the bark and mixed together, and I add caustic soda, nine pounds, and soda-ash, nine pounds, and subject the mixture to a heat of about two hundred and twelve degrees ($212°$) Fahrenheit for about five hours. This will produce what I term a "neutral compound," which will not cause the water to foam or thicken, and will not disintegrate or corrode metal to any injurious effect. I here add that the acid in the black-oak bark is necessary to neutralize wholly the alkalies, and that the compounds may be made by changing the proportions of the ingredients, and answer a good purpose; but I prefer the proportions given; and that the black-walnut bark may be substituted by the ingredients given in the analysis, in which case they are to be put together, omitting the lime, and boiled in the same quantity of water as the black-walnut bark, and then added to the other liquids before the alkalies are added.

For the first application to a boiler, put in the boiler one-half pint of the compound to each horse-power, and also about the same amount two or three days thereafter. After this, half of that quantity, used twice a week, will generally serve to keep the boiler clear of scale. But these quantities have to be varied when different waters are used to make steam. A little observation, however, will enable an engineer to know how much to use.

I claim as new—

The walnut bark, or its chemical ingredients, as given, combined with caustic soda, soda-ash, black-oak bark, and white-oak bark, compounded as and for the purpose set forth.

JAMES RILEY.

Witnesses:
O. H. ADIX,
E. A. SHERBURNE.